US009298054B2

(12) United States Patent
Kim et al.

(10) Patent No.: US 9,298,054 B2
(45) Date of Patent: Mar. 29, 2016

(54) LIQUID CRYSTAL DISPLAY DEVICE AND METHOD OF MANUFACTURING THE SAME

(71) Applicant: LG DISPLAY CO., LTD., Seoul (KR)

(72) Inventors: Ka Kyung Kim, Paju-si (KR); Eui Hyun Chung, Goyang-si (KR); Seong Jun Cho, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/285,996

(22) Filed: May 23, 2014

(65) Prior Publication Data

US 2014/0347589 A1 Nov. 27, 2014

(30) Foreign Application Priority Data

May 24, 2013 (KR) ........................ 10-2013-0059054

(51) Int. Cl.
*G02F 1/136* (2006.01)
*G02F 1/1362* (2006.01)

(52) U.S. Cl.
CPC .... *G02F 1/136286* (2013.01); *G02F 1/136227* (2013.01); *G02F 2201/40* (2013.01)

(58) Field of Classification Search
CPC ...................................................... G02F 1/136
USPC ........................................................... 349/43
See application file for complete search history.

(56) References Cited

U.S. PATENT DOCUMENTS 5,777,703 A * 7/1998 Nishikawa ...................... 349/47
7,649,605 B2 * 1/2010 Kim .............................. 349/141

* cited by examiner

*Primary Examiner* — Lucy Chien
(74) *Attorney, Agent, or Firm* — Dentons US LLP

(57) ABSTRACT

Disclosed are a liquid crystal display (LCD) device and a method of manufacturing the same, which can increase a transmittance of a high-resolution pixel. The LCD device includes a gate line formed to be shared by vertically adjacent first and second pixels, a data line formed to interest the gate line, first and second thin film transistors (TFTs) respectively formed in the first and second pixels, a passivation layer formed to cover the first and second TFTs, including a contact hole that exposes drains of the first and second TFTs, first and second pixel electrodes formed on the passivation layer and in the contact hole, and respectively connected to the drains of the first and second TFTs, and a common electrode formed under or on the first and second pixel electrodes.

15 Claims, 8 Drawing Sheets

LIQUID CRYSTAL DISPLAY DEVICE AND METHOD OF MANUFACTURING THE SAME

CROSS-REFERENCE TO RELATED APPLICATIONS

This application claims the benefit of the Korean Patent Application No. 10-2013-0059054 filed on May 24, 2013, which is hereby incorporated by reference as if fully set forth herein.

BACKGROUND

1. Field of the Invention

The present invention relates to a display device, and more particularly, to a liquid crystal display (LCD) device and a method of manufacturing the same, which can increase a transmittance of a high-resolution pixel.

2. Discussion of the Related Art

With the advance of various portable electronic devices such as mobile terminals and notebook computers, the demand for flat panel display devices applied to the portable electronic devices is increasing.

Liquid crystal display (LCD) devices, plasma display panels (PDPs), field emission display (FED) devices, light emitting diode (LED) display devices, organic light emitting device, etc. are developed as flat panel display devices.

In such FPD devices, the LCD devices are being continuously expanded in application field because the LCD devices are easily manufactured due to the advance of manufacturing technology and realize drivability of a driver, low power consumption, a high-quality image, and a large screen.

FIG. 1 is a plan view schematically illustrating a lower substrate (a thin film transistor (TFT) array substrate) of a related art LCD device, and FIG. 2 is a cross-sectional view taken along line A1-A2 of FIG. 1.

In FIG. 1, a lower substrate structure having a fringe field switch (FFS) mode is illustrated, and a common electrode, an upper substrate (a color filter array substrate), and a liquid crystal layer are not illustrated. In FIG. 1, only some of a plurality of pixels are illustrated.

Referring to FIGS. 1 and 2, the plurality of pixels are formed on the lower substrate of the LCD device. A plurality of pixel areas are defined by a plurality of data lines 20 and a plurality of gate lines 10 which are formed on a glass substrate 1 to intersect.

A TFT is formed in each of a plurality of areas in which the plurality of data lines 20 intersect the plurality of gate lines 10. Also, each of the plurality of pixels includes a pixel electrode 40 and a common electrode (not shown).

The TFT includes a gate 32, an active 34, a source 36, and a drain 38. The gate 32 of the TFT is formed by using a gate line, and the source 36 and the drain 38 are formed simultaneously when forming the data line 20.

A gate insulator (GI) 12 is formed between the gate 32 and the active 34. The gate insulator 12 is formed of silicon nitride (SiNx) or silicon oxide An interlayer dielectric (ILD) 14 is formed all over the substrate 1 to cover the TFT and the data line 20.

A passivation layer 45 is formed on the ILD 14. Here, the passivation layer 45 is formed of photo acryl (PAC) to have a thickness of 2 μm to 3 μm.

A pixel electrode 40 is formed in a display area on the passivation layer 45. The common electrode (not shown) is formed under/on the pixel electrode 40. The pixel electrode 40 and the common electrode are formed of a transparent conductive material such as indium tin oxide (ITO).

A contact hole 50 is formed by removing a portion of the passivation layer 45, for electrically connecting the drain 38 of the TFT and the pixel electrode 40. The pixel electrode 40 contacts the drain 38 of the TFT through the contact hole 50, and a data voltage input through the data line 20 is supplied to the pixel area via the TFT.

Recently, the LCD device applied to mobile equipment requires a high resolution of 400 PPI to 500 PPI exceeding 300 PPI.

When the active of the TFT is formed of amorphous silicon (a-Si), due to the contact hole 50 for connecting the drain 38 of the TFT and the pixel electrode 40, there is a limitation in realizing a high resolution. As a resolution increases, an area of each pixel decreases, but an area of the contact hole 50 should not be reduced. Therefore, a ratio of an area occupied by the contact hole 50 increases in each pixel, and for this reason, an aperture ratio of each pixel decreases, causing a reduction in a transmittance. Due to the decrease in the aperture ratio of each pixel, a luminance of a backlight and power consumption increase, causing a reduction in a competitiveness of a produce.

LCD devices having a high resolution of 400 PPI or more use low temperature poly silicon (LTPS) instead of a-Si. However, in comparison with a-Si, LTPS is relatively high in price, and lowers a price competitiveness of a product.

SUMMARY

Accordingly, the present invention is directed to provide a liquid crystal display (LCD) device and a method of manufacturing the same that substantially obviate one or more problems due to limitations and disadvantages of the related art.

An aspect of the present invention is directed to provide an LCD device and a method of manufacturing the same, which increase a transmittance of each pixel, thereby enhancing a display quality.

Another aspect of the present invention is directed to provide an LCD device and a method of manufacturing the same, which realize a high-resolution pixel and reduce the manufacturing cost.

Another aspect of the present invention is directed to provide an LCD device and a method of manufacturing the same, which reduce an area of a contact hole that connects a drain of a TFT and a pixel electrode, thereby increasing an aperture ratio of each pixel.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an liquid crystal display (LCD) device including: a gate line formed to be shared by vertically adjacent first and second pixels; a data line formed to interest the gate line; first and second thin film transistors (TFTs) respectively formed in the first and second pixels; a passivation layer formed to cover the first and second TFTs, including a contact hole that exposes drains of the first and second TFTs; first and second pixel electrodes formed on the passivation layer and in the contact hole, and respectively connected to the drains of the first and second TFTs; and a common electrode formed under or on the first and second pixel electrodes.

In another aspect of the present invention, there is provided a method of a liquid crystal display (LCD) device including: forming a gate line and a gate of a thin film transistor (TFT) to be shared by vertically adjacent first and second pixels; forming a gate insulator to cover the gate line, and forming an active of a first TFT of the first pixel and an active of a second TFT of the second pixel on the gate insulator; forming a data line to interest the gate line, and forming a source and drain of the first TFT and a source and drain of the second TFT; forming a passivation layer to cover the first TFT of the first pixel and the second TFT of the second pixel; forming a contact hole that exposes the drain of the first TFT and the drain of the second TFT; and doping and patterning a transparent conductive material on the passivation layer and in the contact hole to form a first pixel electrode, connected to the drain of the first TFT, and a second pixel electrode connected to the drain of the second TFT.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
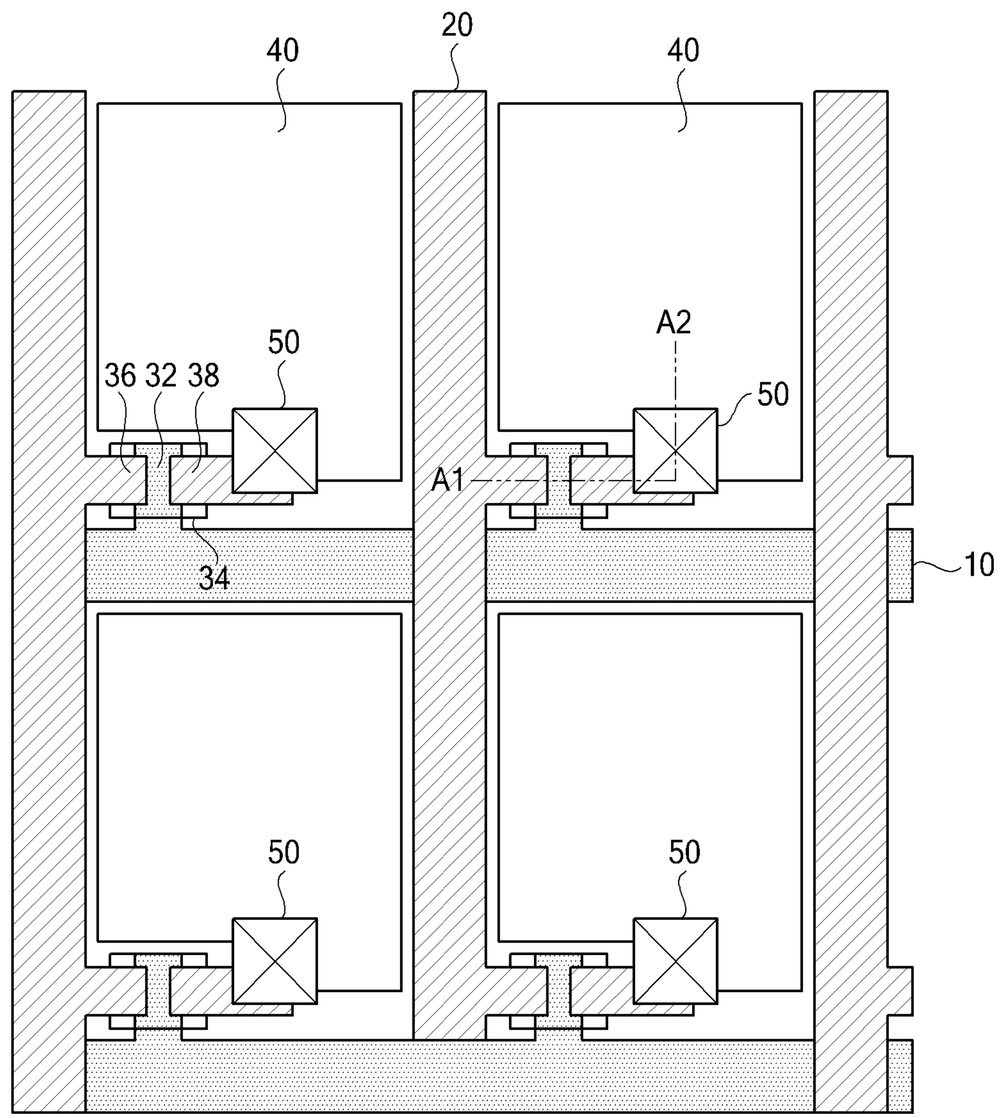
FIG. 1 is a plan view schematically illustrating a lower substrate (a TFT array substrate) of a related art LCD device.
Figure 2:
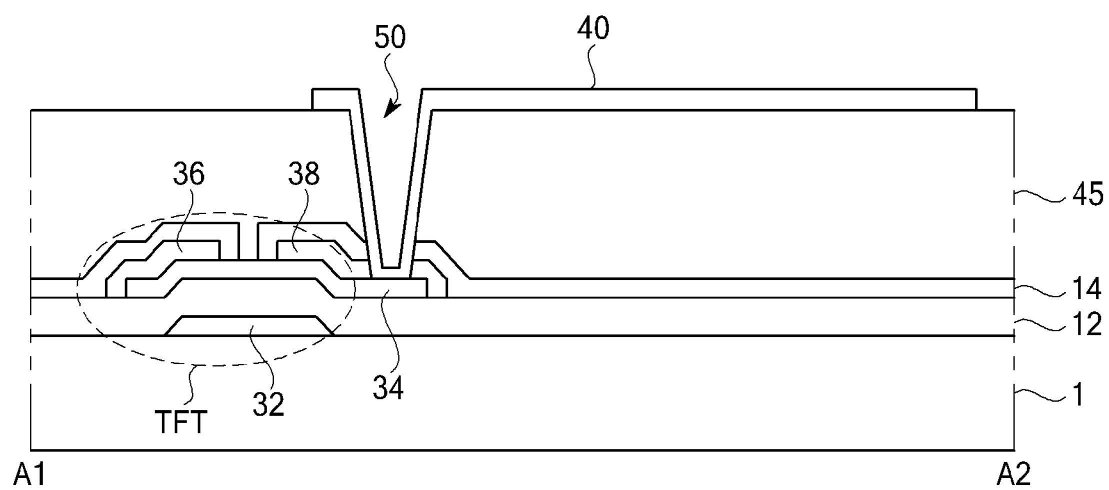
FIG. 2 is a cross-sectional view taken along line A1-A2 of FIG. 1.

Reference will now be made in detail to the exemplary embodiments of the present invention, examples of which are illustrated in the accompanying drawings. Wherever possible, the same reference numbers will be used throughout the drawings to refer to the same or like parts.

In the specification, in adding reference numerals for elements in each drawing, it should be noted that like reference numerals already used to denote like elements in other drawings are used for elements wherever possible.

The terms described in the specification should be understood as follows.

As used herein, the singular forms “a”, “an” and “the” are intended to include the plural forms as well, unless the context clearly indicates otherwise. The terms “first” and “second” are for differentiating one element from the other element, and these elements should not be limited by these terms.

It will be further understood that the terms “comprises”, “comprising,”, “has”, “having”, “includes” and/or “including”, when used herein, specify the presence of stated features, integers, steps, operations, elements, and/or components, but do not preclude the presence or addition of one or more other features, integers, steps, operations, elements, components, and/or groups thereof.

The term “at least one” should be understood as including any and all combinations of one or more of the associated listed items. For example, the meaning of “at least one of a first item, a second item, and a third item” denotes the combination of all items proposed from two or more of the first item, the second item, and the third item as well as the first item, the second item, or the third item.

In description of embodiments of the present invention, when a structure (for example, an electrode, a line, a wiring, a layer, or a contact) is described as being formed at an upper portion/lower portion of another structure or on/under the other structure, this description should be construed as including a case where the structures contact each other and moreover a case where a third structure is disposed therebetween.

Terms “upper portion/lower portion” and “on/under” are for describing the structure and manufacturing method of the present invention with reference to the drawings. Therefore, the terms “upper portion/lower portion” and “on/under” may differ in structure during a manufacturing process and after manufacturing is completed.

Before a description that is made with reference to the drawings, LCD devices have been variously developed in a twisted nematic (TN) mode, a vertical alignment (VA) mode, an in-plane switching (IPS) mode, and a fringe field switching (FFS) mode according to a scheme of adjusting the alignment of liquid crystal.

Among the modes, the IPS mode and the FFS mode are modes in which a plurality of pixel electrodes and common electrodes are arranged on a lower substrate, and thus, the alignment of liquid crystal is adjusted with electric fields between the pixel electrodes and the common electrodes.

The IPS mode is a mode in which the pixel electrodes and the common electrodes are alternately arranged in parallel, and thus, lateral electric fields are respectively generated between the pixel electrodes and the common electrodes, thereby adjusting the alignment of the liquid crystal. In the IPS mode, the alignment of the liquid crystal is not adjusted at an upper side portion of each of the pixel electrodes and common electrodes, and thus, light transmittance is reduced in a corresponding area.

The FFS mode has been developed for overcoming the limitations of the IPS mode. In the IPS mode, the pixel electrode and the common electrode is provided in plurality to be separated from each other with an insulating layer therebetween.

In this case, the FFS mode is a mode in which one electrodes of the pixel electrodes and common electrodes are provided in a plate shape or a pattern, and the other electrodes are provided in a finger shape, thereby adjusting the alignment of liquid crystal with fringe fields generated between the pixel electrodes and common electrodes.

An LCD device with a built-in touch screen according to embodiments of the present invention has a structure of the FFS mode. LTPS may be used as a material of a TFT array substrate (a lower substrate).

Although not shown, the LCD device according to embodiments of the present invention includes a liquid crystal panel, a backlight unit that supplies light to the liquid crystal panel, and a driving circuit unit.

The driving circuit unit includes a timing controller (T-con), a data driver (D-IC), a gate driver (G-IC), a backlight driver, and a power supply that supplies a driving voltage to a plurality of driving circuits.

Here, all or a portion of the driving circuit unit may be provided on the liquid crystal panel in a chip-on glass (COG) type or a chip-on film (COF, chip on flexible printed circuit) type.

The backlight unit may include a plurality of light sources (LED or CCFL), which generate light irradiated onto the liquid crystal panel, and a plurality of optical members that enhance light efficiency.

Hereinafter, an LCD device and a method of manufacturing the same according to embodiments of the present invention will be described in detail with reference to the accompanying drawings.

Figure 3:
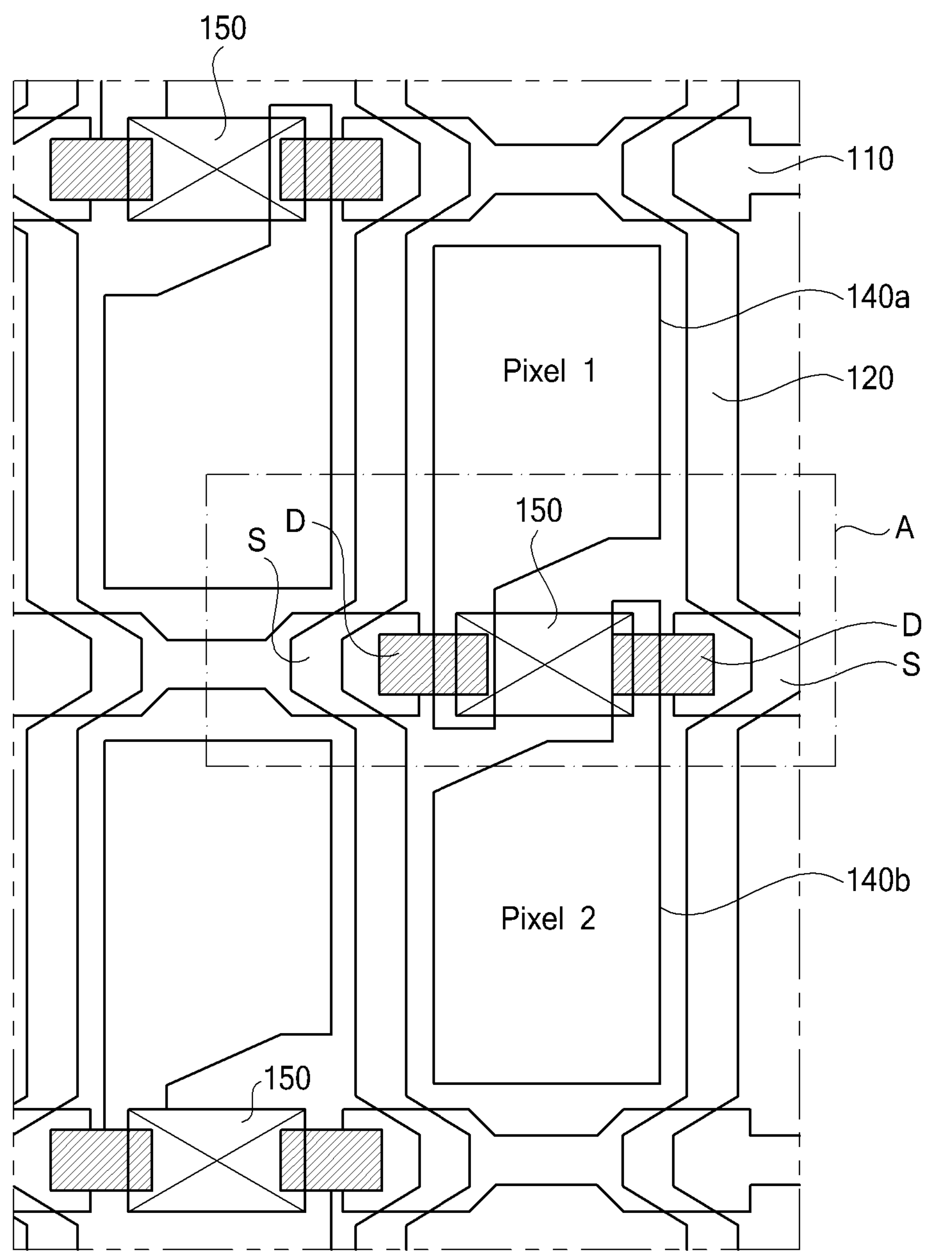
FIG. 3 is a plan view schematically illustrating a lower substrate (a TFT array substrate) of an LCD device according to an embodiment of the present invention.
Figure 4:
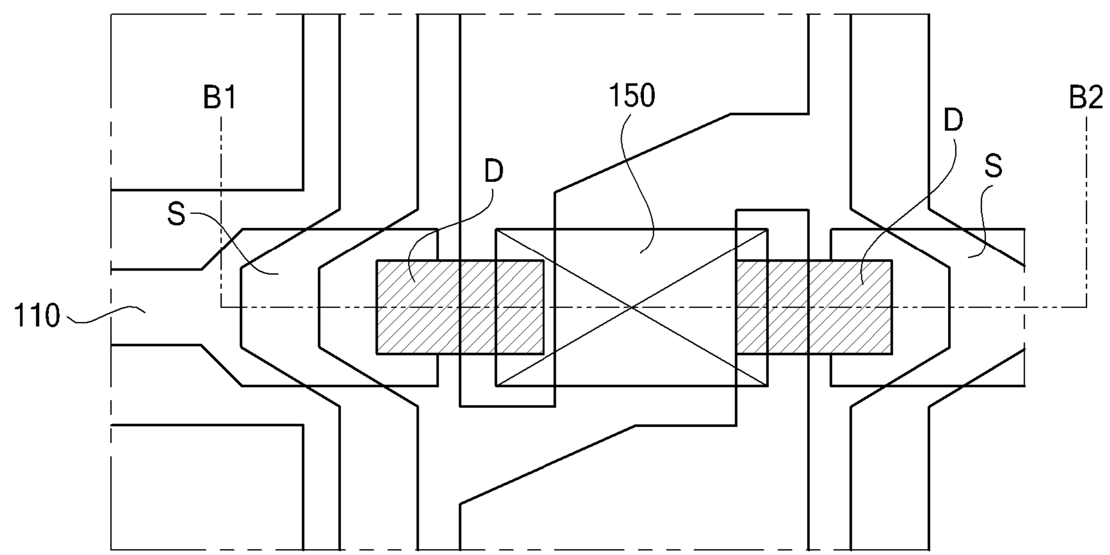
FIG. 4 is a view illustrating an enlarged area A of FIG. 3.
Figure 5:
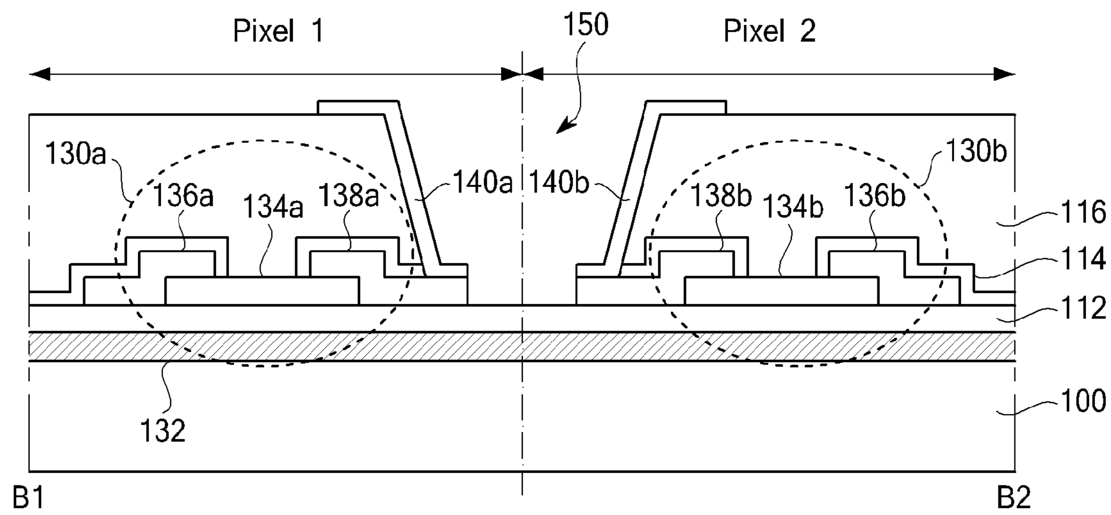
FIG. 5 is a cross-sectional view taken along line B1-B2 of FIG. 4.

FIG. 3 is a plan view schematically illustrating a lower substrate (a TFT array substrate) of an LCD device according to an embodiment of the present invention, FIG. 4 is a view illustrating an enlarged area A of FIG. 3, and FIG. 5 is a cross-sectional view taken along line B1-B2 of FIG. 4.

Referring to FIGS. 3 to 5, a lower substrate (a TFT array substrate) includes a glass substrate 100, a gate line 110, a data line 120, a gate insulator (GI) 112, an interlayer dielectric (ILD) 114, a thin film transistor (TFT) 130, a passivation layer 116, a plurality of pixel electrodes 140*a* and 140*b*, and a common electrode (not shown).

In the LCD device according to the present invention, two vertically adjacent pixels share the gate line 110, and share one contact hole 150 to connect a drain 138*a* of a first TFT 130*a* and the pixel electrode 140*a*. The two vertically adjacent pixels share the contact hole 150 to connect a drain 138*b* of a second TFT 130*b* and the pixel electrode 140*b*. Here, the drain 138*a* of a first pixel (pixel 1) disposed above the gate line 110 and the drain 138*b* of a second pixel (pixel 2) disposed below the gate line 110 are separated from each other in the one contact hole 150.

In detail, a plurality of pixel areas are defined by a plurality of data lines 120 and a plurality of gate lines 110 which are formed on the glass substrate 100 to intersect. The plurality of gate lines 110 are formed in a first direction on the glass substrate 100, and the plurality of data lines 120 are formed in a second direction intersecting the first direction. A TFT is formed in each of a plurality of areas in which the plurality of data lines 120 intersect the plurality of gate lines 110

In FIG. 5, it is illustrated that the first TFT 130*a* of the first pixel and the second TFT 130*b* of the second pixel which are vertically adjacent to each other and share one gate line 110 are formed.

The gate line 110 and the data line 120 are formed of one of copper (Cu), molybdenum (Mo), and titanium (Ti), or may be formed in a structure in which an alloy of the metal materials (Cu, Mo, and Ti) is stacked.

Gates 132*a* and 132*b* of the TFT 130 are formed by using the gate line 110, and the gate insulator 112 is formed on the gates 132*a* and 132*b*. A plurality of actives 134*a* and 134*b* are formed on the gate insulator 112. The actives 134*a* and 134*b* overlap a gate 132 with the gate insulator 112 therebetween. The actives 134*a* and 134*b* are formed by doping N-type or P-type impurities on a-Si.

Here, the gate insulator 112 may be formed of silicon nitride (SiNx) or silicon oxide (SiOx) to have a thickness of 4,000 Å. As another example, the gate insulator 112 may be formed by depositing tetra ethyl ortho silicate (TEOS) or middle temperature oxide (MTO) in a chemical vapor deposition (CVD) process.

A source 136*a* is formed at one side on the active 134*a*, and a source 136*b* is formed at one side on the active 134*b*. The drain 138*a* is formed at the other side on the active 134*a*, and the drain 138*b* is formed at the other side on the active 134*b*. The sources 136*a* and 136*b* and the drains 138*a* and 138*b* are formed of conductive metal (for example, Cu, Ti, or Mo), and are formed of the same material simultaneously when forming the data line 120.

The ILD 114 is formed to cover TFTs 130*a* and 130*b*, and the passivation layer 116 is formed thereon. The passivation layer 116 is formed of photo acryl (PAC) all over the substrate 100 to have a thickness of 2.0 μm to 3.0 μm.

The contact hole 150 is formed by removing a boundary point between the vertically adjacent first and second pixels, namely, the passivation layer 116 in an area which overlaps the gate line 110 shared by the first and second pixels. That is, the contact hole 150 is formed to overlap the gate line 110 shared by the vertically adjacent first and second pixels.

The passivation layer 116 is formed by depositing PAC all over the substrate 100 when a manufacturing process is being performed. Then, PAC in an area overlapping the gate line 110 shared by two vertically adjacent pixels is selectively removed by performing a photolithography process and an etching process which use a mask. Therefore, the contact hole 150 is formed in the area overlapping the gate line 110 shared by two vertically adjacent pixels.

The pixel electrodes 140*a* and 140*b* are formed of a conductive material, such as ITO, on the passivation layer 116 and in the contact hole 150. In this case, each of the pixel electrodes 140*a* and 140*b* is formed in a plate shape or a finger shape.

The contact hole 150 is formed for respectively connecting the TFTs 130 (which are formed in the two vertically adjacent pixels) and the pixel electrodes 140, and has a structure in which the two vertically adjacent pixels share the one contact hole 150.

The drain 138 of the TFT 130 and the pixel electrode 140, which are formed in the first pixel disposed at an upper side, are connected by the contact hole 150. The drain 138 of the TFT 130 and the pixel electrode 140, which are formed in the second pixel disposed at a lower side, are connected by the contact hole 150.

Here, the drain 138*a* of the first TFT 130*a* is connected to the drain 138*b* of the second TFT 130*b* in a manufacturing process. However, a connected portion between the drain 138*a* of the first TFT 130*a* and the drain 138*b* of the second TFT 130*b* is etched when patterning the pixel electrode 140, and the drain 138*a* of the first TFT 130*a* is separated from the drain 138*b* of the second TFT 130*b*.

Although not shown, a common electrode is formed in each pixel. In this case, a position with the common electrode formed thereat may be changed for each model depending on a design of a lower substrate. The common electrode is formed under or on the pixel electrodes 140*a* and 140*b*, and a fringe field is generated between the pixel electrodes 140*a* and 140*b* and the common electrode to adjust an alignment of liquid crystal of a liquid crystal layer (not shown). A transmittance of light incident from a backlight unit is adjusted by aligning the liquid crystal, thereby displaying an image.

When the common electrode is formed on the pixel electrodes 140*a* and 140*b*, a second passivation layer is formed to cover the pixel electrodes 140*a* and 140*b*, and the common electrode is formed on the second passivation layer in a plate shape or a finger shape. The second passivation layer may be formed of SiNx or $SiO_2$ to have a thickness of 6,000 Å.

As described above, in the two vertically adjacent pixels, by the one contact hole 150, the first TFT 130*a* is connected to the first pixel electrode 140*a*, and the second TFT 130*b* is connected to the second pixel electrode 140*b*, thereby reducing an area occupied by the contact hole 150 in an entire pixel area.

By applying the pixel structure of the LCD device according to an embodiment of the present invention, a transmittance can be enhanced by 40% in comparison with the pixel structure of the related art LCD device.

Moreover, since the contact hole 150 is formed on the gate line 110 shared by vertically adjacent pixels, an aperture loss caused by the contact hole 150 is reduced, and a transmittance in a display area increases.

FIGS. 6 to 11 are views illustrating a method of manufacturing an LCD device according to an embodiment of the present invention. Hereinafter, the method of manufacturing an LCD device according to an embodiment of the present invention will be described in detail with reference to FIGS. 6 to 11.

Figure 6:
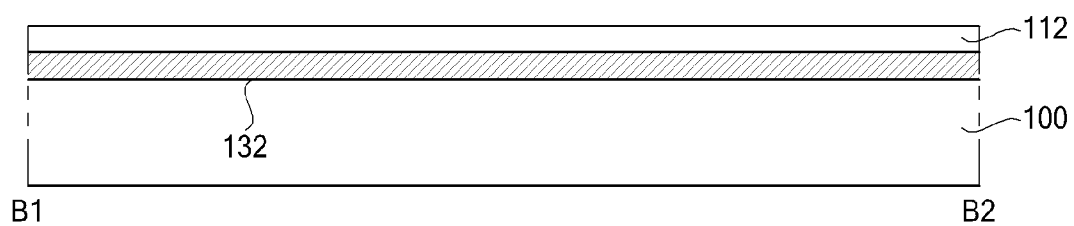
FIGS. 6 to 11 are views illustrating a method of manufacturing an LCD device according to an embodiment of the present invention.

Referring to FIG. 6, Cu, Mo, Ti, or an alloy thereof is deposited on the glass substrate 100, and then, a plurality of gate lines and the gates 132*a* and 132*b* of the TFT are formed by performing a photolithography process and a wet etching process which use a mask.

Subsequently, the gate insulator 112 is formed all over the glass substrate 100 to cover the gate line and the gates 132*a* and 132*b*.

Here, the gate insulator 112 may be formed of silicon nitride (SiNx) or silicon oxide (SiOx) to have a thickness of 4,000 Å. In addition, the gate insulator 112 may be formed by depositing tetra ethyl ortho silicate (TEOS) or middle temperature oxide (MTO) in a chemical vapor deposition (CVD) process.

Figure 7:
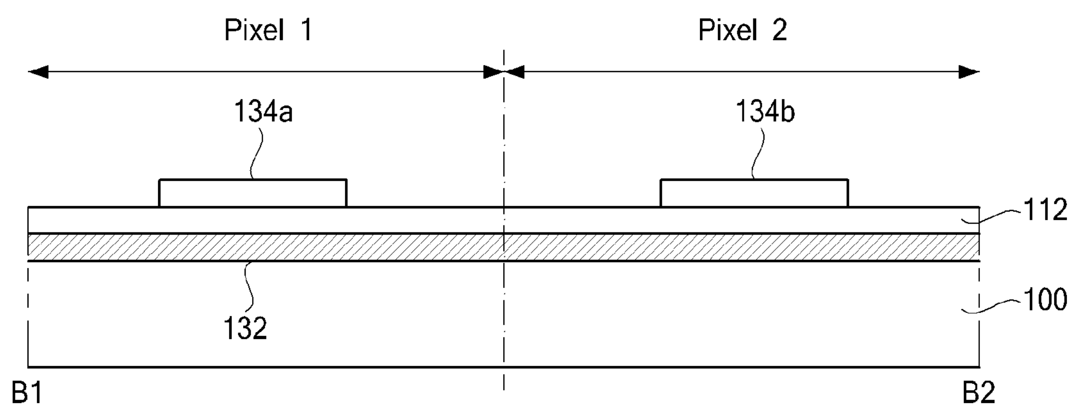

Subsequently, referring to FIG. 7, the actives 134*a* and 134*b* are formed of a-Si in respective areas which overlap the gates 132*a* and 132*b* in a TFT area, on the gate insulator 112. The actives 134*a* and 134*b* may be formed of an a-Si semiconductor material and an N+ or P+ doping layer.

Here, a-Si is deposited on the gate insulator 112, and then is patterned by a photolithography process using a mask and an etching process. Subsequently, impurities are doped with photoresist (PR) by performing a dry etching process, and then, the actives 134*a* and 134*b* are formed by removing the photoresist (PR).

Figure 8:
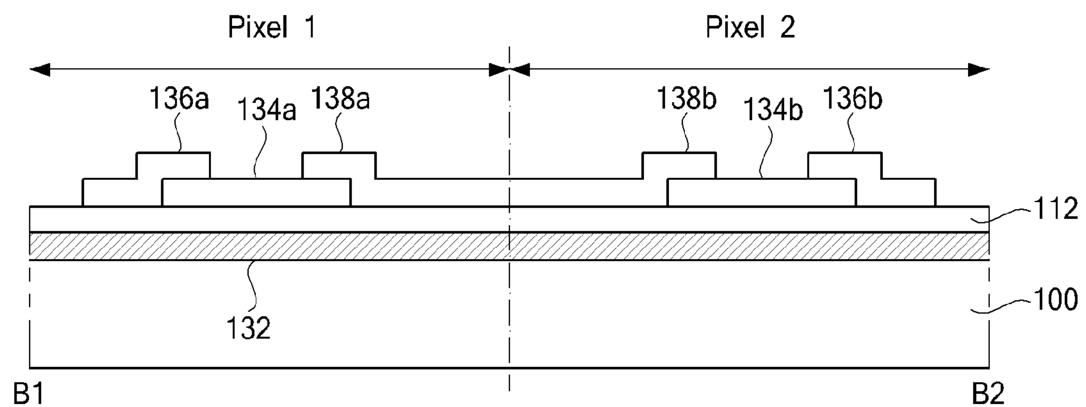

Subsequently, referring to FIG. 8, the data line is formed to intersect the gate line, and simultaneously, the source 136*a* and drain 138*a* of the first TFT are formed. Also, the source 136*b* and drain 138*b* of the second TFT are formed. The source 136*a* is formed at one side on the active 134*a* of the first TFT, and the drain 138*a* is formed at the other side on the active 134*a*. In addition, the source 136*b* is formed at one side on the active 134*b* of the second TFT, and the drain 138*b* is formed at the other side on the active 134*b*.

The sources 135*a* and 136*b* and the drains 138*a* and 138*b* are formed of conductive metal (for example, Cu, Ti, or Mo), and are formed of the same material simultaneously when forming the data line. As described above, the gates 132*a* and 132*b*, the actives 134*a* and 134*b*, the sources 136*a* and 136*b*, and the drains 138*a* and 138*b* are formed in each pixel, thereby manufacturing the TFTs 130*a* and 130*b*.

Here, the drain 138*a* of the first TFT 130*a* formed in the first pixel and the drain 138*b* of the second TFT 130*b* formed in the second pixel are connected so far without being separated from each other. However, when patterning the pixel electrode in a subsequent process, the drain 138*a* of the first TFT 130*a* is separated from the drain 138*b* of the second TFT 130*b*, in the contact hole 150.

Figure 9:
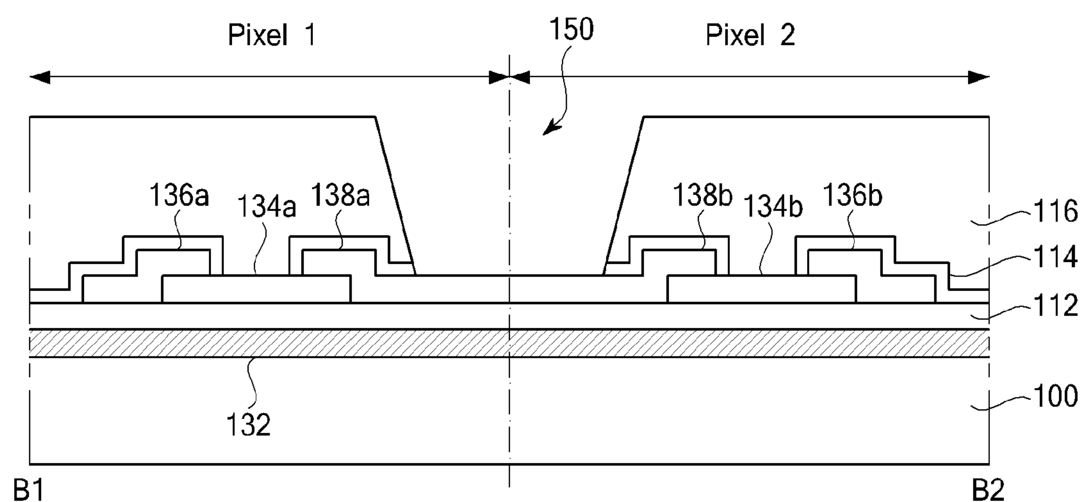

Subsequently, referring to FIG. 9, the ILD 114 is formed to cover TFTs 130*a* and 130*b*, and the passivation layer 116 is formed thereon. The passivation layer 116 is formed of PAC all over the substrate 100 to have a thickness of 2.0 μm to 3.0 μm.

To describe with common reference to FIG. 3, the passivation layer 116 is formed, and then, the contact hole 150 is formed by removing a boundary point between the vertically adjacent first and second pixels, namely, the passivation layer 116 in an area which overlaps the gate line 110 shared by the first and second pixels.

The passivation layer 116 is formed by depositing PAC all over the substrate 100 when a manufacturing process is being performed, and then, PAC in an area overlapping the gate line 110 shared by two vertically adjacent pixels is selectively removed by performing a photolithography process and an etching process which use a mask, thereby forming the contact hole 150.

The contact hole 150 is formed for respectively connecting the TFTs 130 (which are formed in the two vertically adjacent pixels) and the pixel electrodes 140. The two vertically adjacent pixels are formed on the gate line 110, shared by the two vertically adjacent pixels, to share the one contact hole 150.

Figure 10:
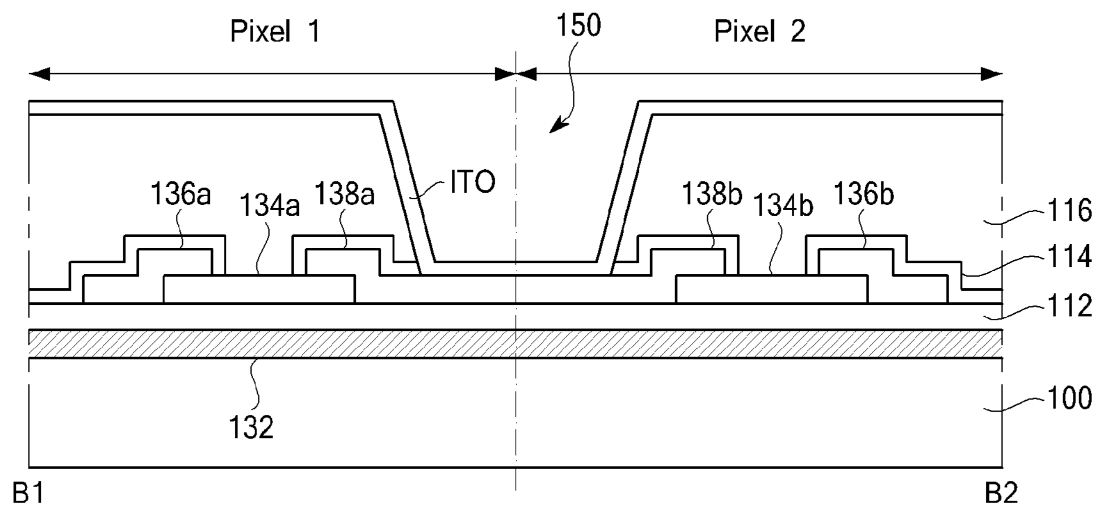

Subsequently, referring to FIG. 10, a conductive material such as ITO is wholly deposited on the passivation layer 116 and in the contact hole 150, thereby forming a transparent electrode layer. The transparent electrode layer is formed on the drains 138*a* and 138*b* of the first and second pixels in the contact hole 150, in addition to the passivation layer 116, and is connected to the drains of the two vertically adjacent pixels.

Figure 11:
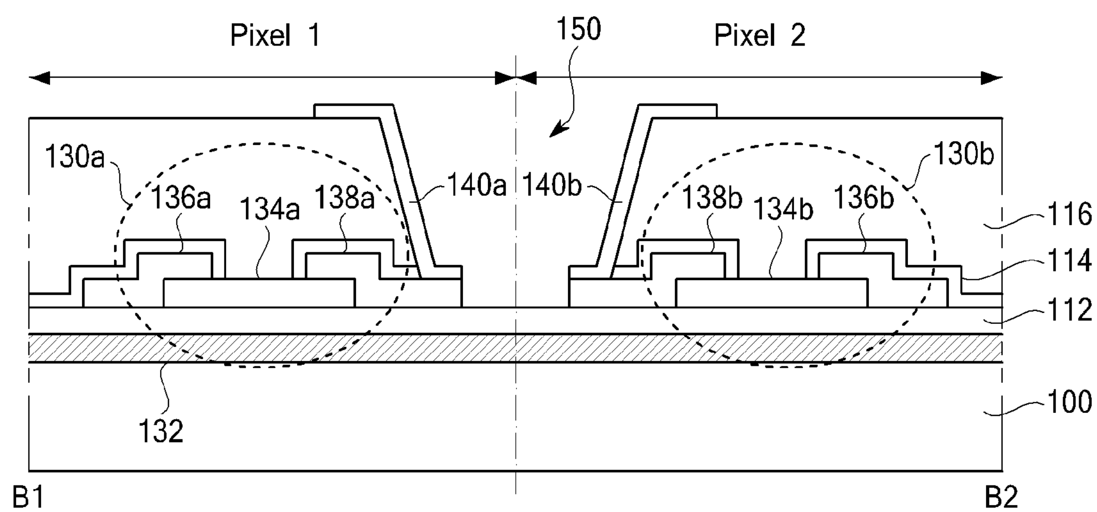

Subsequently, referring to FIG. 11, the pixel electrodes 140*a* and 140*b* are formed by patterning the transparent electrode. In this case, ITO of the pixel electrodes 140*a* and 140*b* and metal of the drains 138*a* and 138*b* are batch etched. Thus, the drain 138*a* of the first TFT 130*a* formed in the first pixel and the drain 138*b* of the second TFT 130*b* formed in the second pixel which are connected in the contact hole 150 are separated from each other.

That is, the drain 138*a* of the first TFT 130*a* for driving the first pixel and the drain 138*b* of the second TFT 130*b* for driving the second pixel are separated from each other in the contact hole 150 shared by the vertically adjacent first and second pixels. Herewith, the pixel electrode 140*a* of the first pixel is also separated from the pixel electrode 140*b* of the second pixel.

Here, each of the pixel electrodes 140*a* and 140*b* is formed in a plate shape or a finger shape.

The drain 138*a* of the first TFT 130*a* and the pixel electrode 140*a*, which are formed in the first pixel disposed at an upper side, are connected. The drain 138*b* of the second TFT 130*b* and the pixel electrode 140*b*, which are formed in the second pixel disposed at a lower side, are connected.

Although not shown, a process of forming the common electrode may be additionally performed, and a position with the common electrode formed thereat may be changed for each model depending on the design of the lower substrate.

When the common electrode is formed on the pixel electrodes 140*a* and 140*b*, the second passivation layer is formed to cover the pixel electrodes 140*a* and 140*b*. The second passivation layer may be formed of SiNx or $SiO_2$ to have a thickness of 6,000 Å. The common electrode is formed of a transparent conductive material, such as ITO, on the second passivation layer to have a plate shape or a finger shape.

Through the above-described manufacturing process, by the one contact hole 150, the first TFT 130*a* and the first pixel electrode 140*a* which are vertically adjacent to each other are connected, and the second TFT 130*b* and the second pixel electrode 140*b* which are vertically adjacent to each other are connected, thereby reducing an area occupied by the contact hole 150 in an entire pixel area.

By applying the pixel structure manufactured by the method of manufacturing the LCD device according to an embodiment of the present invention, a transmittance can be enhanced by 40% in comparison with the pixel structure of the related art LCD device.

Moreover, since the contact hole 150 is formed on the gate line 110 shared by vertically adjacent pixels, an aperture loss caused by the contact hole 150 is reduced, and a transmittance in a display area increases.

The method of manufacturing the LCD device according to an embodiment of the present invention realizes a high-resolution pixel by using a-Si, and reduces the manufacturing cost.

The LCD device and the method of manufacturing the same according to the embodiments of the present invention increase a transmittance of a high-resolution pixel, thereby enhancing a display quality.

The LCD device and the method of manufacturing the same according to the embodiments of the present invention realize a high-resolution pixel by using the a-Si substrate, thereby reducing the manufacturing cost.

The LCD device and the method of manufacturing the same reduce the area of the contact hole that connects the drain of the TFT and the pixel electrode, thereby increasing an aperture ratio of each pixel.

In addition to the aforesaid features and effects of the present invention, other features and effects of the present invention can be newly construed from the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display (LCD) device comprising:

a gate line formed to be shared by vertically adjacent first and second pixels;

a data line formed to interest intersecting the gate line; first and second thin film transistors (TFTs) respectively formed in the first and second pixels; a passivation layer formed to cover covering the first and second TFTs, including a contact hole that exposes drains of the first and second TFTs; first and second pixel electrodes formed on the passivation layer and in the contact hole, and respectively connected to the drains of the first and second TFTs; and a common electrode formed under or on the first and second pixel electrodes: wherein, the contact hole is shared by the vertically adjacent first and second pixels, the first pixel electrode and the drain of the first TFT in the first pixel are connected in the contact hole, and the second pixel electrode and the drain of the second TFT in the second pixel are connected in the contact hole.

2. The LCD device of claim 1, wherein the contact hole overlaps the gate line shared by the vertically adjacent first and second pixels.

3. The LCD device of claim 1, wherein the drain of the first TFT in the first pixel and the drain of the second TFT in the second pixel are separated from each other in the contact hole.

4. A method of a liquid crystal display (LCD) device, the method comprising:

forming a gate line and a gate of a thin film transistor (TFT) to be shared by vertically adjacent first and second pixels;

forming a gate insulator to cover the gate line, and forming an active of a first TFT of the first pixel and an active of a second TFT of the second pixel on the gate insulator;

forming a data line to interest the gate line, and forming a source and drain of the first TFT and a source and drain of the second TFT;

forming a passivation layer to cover the first TFT of the first pixel and the second TFT of the second pixel;

forming a contact hole that exposes the drain of the first TFT and the drain of the second TFT; and doping and patterning a transparent conductive material on the passivation layer and in the contact hole to form a first pixel electrode, connected to the drain of the first TFT, and a second pixel electrode connected to the drain of the second TFT, wherein, the contact hole is shared by the vertically adjacent first and second pixels, the first pixel electrode and the drain of the first TFT in the first pixel are connected in the contact hole, and the second pixel electrode and the drain of the second TFT in the second pixel are connected in the contact hole.

5. The method of claim 4, wherein the contact hole is formed by removing the passivation layer in an area which overlaps the gate line formed to be shared by the vertically adjacent first and second pixels.

6. The method of claim 4, wherein the contact hole is formed on the gate line shared by the vertically adjacent first and second pixels.

7. The method of claim 4, wherein, in forming the drain of the first TFT, the first pixel electrode, the drain of the second TFT, and the second pixel electrode, a metal layer for forming the drains of the first and second TFTs and a transparent electrode layer for forming the first and second pixel electrodes are simultaneously etched.

8. The method of claim 7, wherein the drain of the first TFT and the drain of the second TFT are separated from each other in the contact hole.

9. A liquid crystal display (LCD) device comprising:

a gate line shared by vertically adjacent first and second pixels;

a data line intersecting the gate line;

first and second thin film transistors (TFTs) respectively in the first and second pixels;

a passivation layer covering the first and second TFTs, including a contact hole that exposes drains of the first and second TFTs; and first and second pixel electrodes on the passivation layer and in the contact hole, and respectively connected to the drains of the first and second TFTs; and wherein the contact hole is shared by the vertically adjacent first and second pixels.

10. The LCD device of claim 9, further comprising a common electrode to generate electric fields with the first and second pixel electrodes.

11. The LCD device of claim 10, wherein the common electrode is under or on the first and second pixel electrodes.

12. The LCD device of claim 9, wherein the first pixel electrode and the drain of the first TFT in the first pixel are connected in the contact hole, and the second pixel electrode and the drain of the second TFT in the second pixel are connected in the contact hole.

13. The LCD device of claim 9, wherein the contact hole overlaps the gate line shared by the vertically adjacent first and second pixels.

14. The LCD device of claim 9, wherein the drain of the first TFT in the first pixel and the drain of the second TFT in the second pixel are separated from each other in the contact hole.

15. The LCD device of claim 9, further comprising an interlayer dielectric between the drain of the first TFT and the passivation layer, and between the drain of the second TFT and the passivation layer.

* * * * *